US009386112B2

(12) United States Patent
Kim

(10) Patent No.: US 9,386,112 B2
(45) Date of Patent: Jul. 5, 2016

(54) SERVICE RELAY APPARATUS AND A METHOD FOR SAME

(75) Inventor: Beom Jin Kim, Seoul (KR)

(73) Assignee: CIZION, Seoul (KR)

( * ) Notice: Subject to any disclaimer, the term of this patent is extended or adjusted under 35 U.S.C. 154(b) by 186 days.

(21) Appl. No.: 14/237,161

(22) PCT Filed: Aug. 3, 2012

(86) PCT No.: PCT/KR2012/006192
§ 371 (c)(1),
(2), (4) Date: Feb. 4, 2014

(87) PCT Pub. No.: WO2013/022232
PCT Pub. Date: Feb. 14, 2013

(65) Prior Publication Data
US 2014/0181191 A1   Jun. 26, 2014

(30) Foreign Application Priority Data

Aug. 5, 2011   (KR) .................. 10-2011-0078287

(51) Int. Cl.
*G06F 15/16* (2006.01)
*H04L 29/08* (2006.01)
*G06Q 10/10* (2012.01)

(52) U.S. Cl.
CPC .............. *H04L 67/24* (2013.01); *G06Q 10/101* (2013.01); *H04L 67/303* (2013.01)

(58) Field of Classification Search
USPC .................................. 709/203, 219, 200, 226
See application file for complete search history.

(56) References Cited

U.S. PATENT DOCUMENTS

| 7,120,927 | B1* | 10/2006 | Beyda | H04L 51/28 709/206 |
| 2008/0235570 | A1* | 9/2008 | Sawada | G06Q 10/10 715/230 |
| 2009/0028306 | A1 | 1/2009 | Rhie | |

FOREIGN PATENT DOCUMENTS

| JP | 2008/140353 A | 6/2008 |
| KR | 10-2007-0032418 A | 3/2007 |
| KR | 10-2010-0010109 | 3/2010 |
| KR | 10-2011-0025065 A | 3/2011 |

OTHER PUBLICATIONS

International Search Report for PCT/KR2012/006192 dated Feb. 28, 2013.
International Preliminary Report on Patentability for PCT/KR2012/006192 dated Feb. 11, 2014.

* cited by examiner

*Primary Examiner* — El Hadji Sall
(74) *Attorney, Agent, or Firm* — Knobbe, Martens, Olson & Bear, LLP

(57) ABSTRACT

Disclosed herein is an apparatus for relaying a service, including: a client connector receiving a message from a client; a content storage storing bulletin board information; a controller inserting the message into the bulletin board information; an account information registerer storing account information on each user; and a service connector transmitting the message to one or more service apparatuses corresponding to the account information.

12 Claims, 5 Drawing Sheets

SERVICE RELAY APPARATUS AND A METHOD FOR SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This U.S. non-provisional patent application claims priority under 35 U.S.C. §119 to Korean Patent Application No. 10-2011-0078287, filed on Aug. 5, 2011, in the Korean Intellectual Property Office, the disclosure of which is hereby incorporated by reference in their entirety.

BACKGROUND

1. Technical Field

The present invention relates to a technology of providing a service through a communication network, and more particularly, to a technology of relaying a plurality of services provided through a communication network to interwork between different services.

2. Background Art

As the use of the Internet bulletin board has been popularized, a case in which a sentence written on the Internet bulletin board is morally problematic has been frequently generated. However, in the case of inputting real names in order to write the sentence on the Internet bulletin board, freedom of expression is invaded. Therefore, it is difficult to impose a moral responsibility for an action of indirectly writing a sentence on the Internet bulletin board without directly revealing identifies of individuals.

As a background technology of the present invention, there is a Korean Patent Laid-Open Publication No. 10-2010-0010109.

SUMMARY

An object of the present invention is to provide an apparatus and a method for relaying a plurality of services.

According to an exemplary embodiment of the present invention, there is provided an apparatus for relaying a service, including: a client connector receiving a message from a client; a content storage storing bulletin board information; a controller inserting the message into the bulletin board information; an account information registerer storing service account information on each user; and a service connector transmitting the message to one or more service apparatuses corresponding to the account information.

The bulletin board information may include a module requesting log-in to the service apparatus and interworking with the apparatus for relaying a service by the user through the client, and the account information registerer may insert information corresponding to an account included in a log-in completion signal into the account information in the case in which it receives the log-in completion signal of the account corresponding to the user from the service apparatus from the service connector.

The information corresponding to the account may be one or more of an identification (ID), an access token, and a password corresponding to the account.

The apparatus for relaying a service may further include a message converter generating a conversion message by inserting one or more of receiver identifying information indicating a receiver of the message and a universal resource locator (URL) of a web page on which the message is input into the message, wherein the controller transmits the conversion message to the one or more service apparatuses corresponding to the account information.

The bulletin board information may include a representative account setting interface setting any one of the one or more service apparatuses to a representative account, and the account information registerer may set any one of the one or more service apparatuses to the representative account depending on an input of the user through the representative account setting interface.

The content storage may insert the message into the bulletin board information and set an account of writer of the message to the representative account.

According to another exemplary embodiment of the present invention, there is provided a method for relaying a service by an apparatus for relaying a service providing bulletin board information to a client, including: (a) receiving a message from the client; (b) inserting the message into the bulletin board information; and (c) transmitting the message to one or more service apparatuses corresponding to account information on the client.

The method for relaying a service may further include inserting information corresponding to an account included in a log-in completion signal into the account information in the case in which it receives the log-in completion signal of the account corresponding to an user from the service apparatus, wherein the bulletin board information includes a module requesting log-in to the service apparatus and interworking with the apparatus for relaying a service by the user through the client.

The information corresponding to the account may be one or more of an ID, an access token, and a password corresponding to the account.

The method for relaying a service may further include generating a conversion message by inserting one or more of receiver identifying information indicating a receiver of the message and a URL of a web page on which the message is input into the message, wherein in the step (c), the conversion message is transmitted to the one or more service apparatuses corresponding to the account information.

The bulletin board information may include a representative account setting interface setting any one of the one or more service apparatuses to a representative account, and the method for relaying a service may further include setting any one of the one or more service apparatuses to the representative account depending on an input of a user through the representative account setting interface.

The method for relaying a service may further include inserting the message into the bulletin board information and setting a writer of the message to the representative account.

According to exemplary embodiments of the present invention, even though a user performs log-in with respect to only a single service apparatus, a plurality of service apparatuses may interwork and operate with each other.

According to exemplary embodiments of the present invention, one message may be simultaneously transferred to a plurality of service apparatuses.

According to exemplary embodiments of the present invention, when a user input a reply to a specific message, the corresponding reply is bulletined in an SNS of the user, thereby making it possible to prevent the user from inputting a malicious reply using anonymity.

BRIEF DESCRIPTION OF DRAWINGS

According to exemplary embodiments of the present invention, even though a user performs log-in with respect to only a single service apparatus, a plurality of service apparatuses may interwork and operate with each other.

According to exemplary embodiments of the present invention, one message may be simultaneously transferred to a plurality of service apparatuses.

According to exemplary embodiments of the present invention, when a user input a reply to a specific message, the corresponding reply is bulletined in an SNS of the user, thereby making it possible to prevent the user from inputting a malicious reply using anonymity.

DETAILED DESCRIPTION

The present invention may be variously modified and have several exemplary embodiments. Therefore, specific exemplary embodiments of the present invention will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention.

Further, in the present specification, it is to be understood that when one component is referred to as "transmitting" a signal to another component, one component may be directly connected to another component to transmit a signal to another component or may transmit a signal to another component through any other components unless explicitly described to the contrary.

Figure 1:
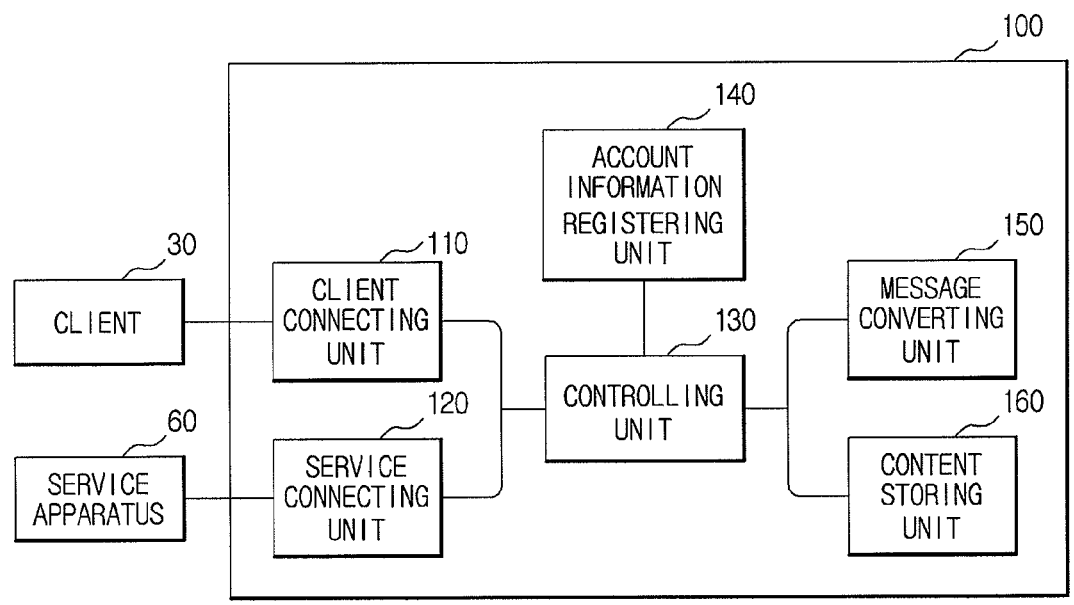

FIG. 1 is a block diagram schematically illustrating an apparatus for relaying a service.

Referring to FIG. 1, an apparatus 100 for relaying a service is configured to include a client connector or client connecting unit 110, a service connector or service connecting unit 120, a controller or controlling unit 130, an account information registerer or account information registering unit 140, a message converter or message converting unit 150, and a message storage or content storing unit 160.

The client connector 110 is connected to a client 30 to transmit and receive data to and from the client 30. For example, the client connecting part 110 may provide bulletin board information to the client 30 and receive an input for log-in through interfaces included in the bulletin board information. In addition, the client connector 110 may receive a predefined input from the client 30 depending on the interfaces included in the bulletin board information, in addition to the input for log-in.

Further, the client connector 110 may transmit information generated through the apparatus 100 for relaying a service to the client 30. Contents of transmitting and receiving inputs to and from the client 30 will be described later in detail with reference to FIG. 2.

The service connector 120 is connected to a service apparatus 60 to transmit and receive data to and from the service apparatus 60. For example, the service connector 120 may receive a service request signal from the controller 130 and transmit the received service request signal to the service apparatus 60. Here, the service request signal may be a signal calling an open application programming interface (API) provided by the service apparatus 60.

The controller 130 transmits the bulletin board information stored in the message storage 160 to the client through the client connector 110. In addition, the controller 130 transmits a service request signal requesting log-in to the service device 60 through the service connector 120 in the case in which an input received from the client connector 110 is an input requesting the log-in.

In addition, the controller 130 transmits a message to the message converter 150 in the case in which the input received from the client connector 110 is an input requesting registration of the message (hereinafter, referred to as a message registration input). In this case, the controller 130 may extract account information corresponding to the client from the account information registerer 140 and transmit the extracted account information to the message converter 150, simultaneously with transmitting the message to the message converter 150. The account information may include one or more of an identification (ID), a profile photo, an access token, a password, whether or not an account has been activated, and representative account identifying information required in order for the client to use a service of the service apparatus 60 registered in the apparatus 100 for relaying a service.

In addition, the controller 130 may transmit messages received from the message converter 150 to the service apparatus 60 through the open API of the service apparatus 60. For example, the controller 130 may transmit a signal requesting a bulletin of the message to the service apparatus 60 through the open API to allow the service apparatus 60 to bulletin the message. The controller 130 may store a message converted by the apparatus 100 for relaying a service so as to be displayed through the bulletin board information (hereinafter, referred to as a display message) among the messages received from the message converter 150 in the message storage 160. Then, the controller 130 may provide the bulletin board information including the display message to the client 30 through the client connector 110 depending on a request of the client 30.

The account information registerer 140 stores account information on each user. In addition, the account information registerer 140 may generate or update the account information on each user by the controller 130. A process of generating or updating the account information will be described later in detail with reference to FIG. 2.

The message converter 150 converts the messages depending on the account information received from the controller 130. For example, in the case in which IDs for a first service apparatus and a second service apparatus are present in the account information and data indicating that accounts for the first service apparatus and the second service apparatus have been activated are included in the account information, the message converter 150 converts the messages into formats corresponding to the first service apparatus and the second service apparatus. In addition, the message converter 150 may convert the messages into formats stored by the message storage 160. A process in which the message converter 150 converts the messages will be described later in detail with reference to FIG. 3.

The message storage 160 stores the message received from the controller 130. The message storage 160 may include a database for storing the messages.

Hereinabove, the respective functional units configuring the apparatus 100 for relaying a service have been described. Hereinafter, an operation process of the apparatus 100 for relaying a service depending on an input of a user through interfaces included in the bulletin board information provided by the apparatus 100 for relaying a service will be described in detail with reference to FIG. 2.

Figure 2:
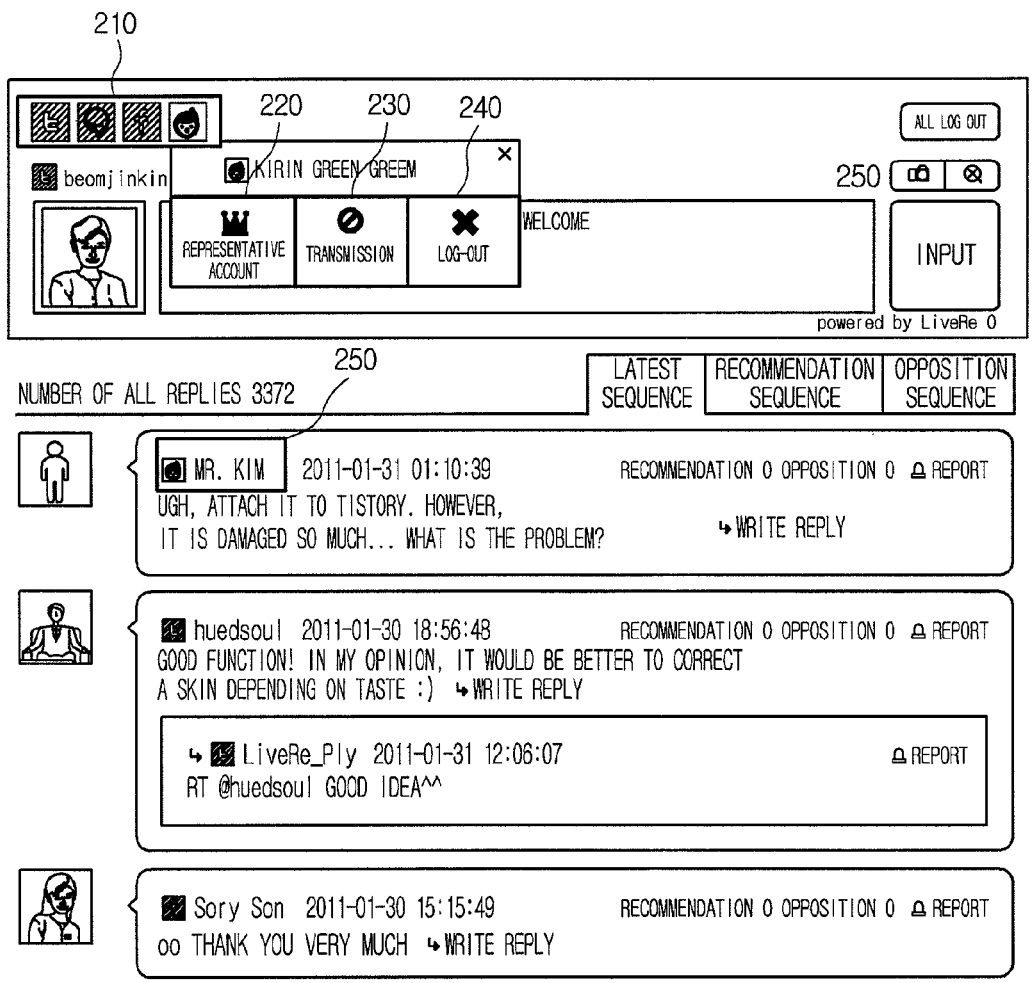

FIG. 2 is a diagram illustrating interfaces included in the bulletin board information provided by the apparatus 100 for relaying a service.

Referring to FIG. 2, the bulletin board information provided by the apparatus 100 for relaying a service includes a service display interface 210, a representative account setting interface 220, an inactivation interface 230, and a log-out interface 240.

The service display interface 210 is an interface displaying services registered by the users. The service display interface 210 may display only icons corresponding to the registered services or may display all of the icons corresponding to predefined services and display icons corresponding to services of which accounts are registered by the users as a color and display icons corresponding to services of which accounts are not registered by the user as a grayscale.

The representative account setting interface 220 is displayed in the case in which the user selects (clicks) an icon corresponding to a service registered by him/her. In the case in which the user selects the representative account setting interface 220, the apparatus 100 for relaying a service may set an account of a service corresponding to an icon of the service display interface 210 recently selected by the user to a representative account.

The inactivation interface 230 is displayed in the case in which the user selects the icon corresponding to the service registered by him/her. In the case in which the user selects the inactivation interface 230, the apparatus 100 for relaying a service may inactivate the account of the service corresponding to the icon of the service display interface 210 recently selected by the user.

The log-out interface 240 is displayed in the case in which the user selects the icon corresponding to the service registered by him/her. In the case in which the user selects the log-out interface 240, the apparatus 100 for relaying a service may perform log-out for the account of the service corresponding to the icon of the service display interface 210 recently selected by the user.

Hereinabove, the respective functions of the interfaces included in the bulletin board information provided by the apparatus 100 for relaying a service have been described. Hereinafter, a process in which the respective functional units described above with reference to FIG. 1 are operated depending on an input of a user through the interfaces of FIG. 2 will be described in detail. Hereinafter, it will be assumed that the users register accounts corresponding to one or more service apparatuses 60, such that account information is stored in the account information registerer 140.

The user requests the bulletin board information to the client connector 110 using the client 30. The client connector 110 transmits the bulletin board information request received from the user to the controller 130. For example, the user has accessed a web page A through the client 30, and the web page A is a web page displaying the bulletin board information including a reply bulletin board (a bulletin board displaying a reply: See FIG. 2) provided by the apparatus 100 for relaying a service.

The controller 130 may search the message stored in the message storage 160 depending on the bulletin board information request, generate the bulletin board information including the searched message, and transmit the generated bulletin board information to the client 30 through the client connector 110. For example, the controller 130 transmits the bulletin board information including the reply bulletin board to the client 30 through the client connector 110 depending on the bulletin board information request.

The client 30 displays the bulletin board information and then receives an input for log-in from the user. For example, the user selects any one of the icons of the service display interface 210 of FIG. 2. Here, in the case in which the user selects an icon of the service display interface 210 in the state in which he/she does not currently perform the log-in, the bulletin board information may include the open API requesting log-in to the service apparatus 60 corresponding to the selected icon and interworking with the apparatus for relaying a service. Therefore, in the case in which the client 30 receives an input for selecting the icon of the service display interface 210 of the bulletin board information, it requests the log-in to the service apparatus 60 corresponding to the icon through the open API. Then, the client 30 receives and displays a web page for log-in from the service apparatus 60 and receives an input for log-in of the user through the received web page. Therefore, the service apparatus 60 may perform the log-in with respect to the user and transmit a log-in completion signal indicating that the log-in has been completed to the service connector 120 after the log-in has been completed. The service connector 120 transmits the log-in completion signal to the controller 130. Here, the log-in completion signal may include an access token corresponding to an account logged-in in the service apparatus 60. The controller 130 requests account information corresponding to the logged-in account to the account information registerer 140. The account information registerer 140 searches account information including a corresponding ID depending on the request received from the controller 130 and transmits the searched account information to the controller 130. Here, in the case in which the account information corresponding to the logged-in account is not present, the account information registerer 140 may newly generate account information including a corresponding ID. The controller 130 transmits access tokens corresponding to the service apparatuses 60 that do not currently perform the log-in among the respective service apparatuses 60 included in the account information to the corresponding access apparatuses 60 through the open APIs provided by the respective service apparatuses 60. Therefore, the respective service apparatuses 60 may perform a log-in process for a corresponding account using the access tokens received through the open APIs. The respective service apparatuses complete the log-in process and then transmit log-in completion signals to the service connector 120. The service connector 120 transmits the log-in completion signals to the controller 130, and the controller 130 activates and displays icons corresponding to the service apparatuses 60 completing the log-in depending on the log-in completion signals (displays the icons as color icons among gray scale and color icons).

Hereinabove, the process in which the user performs the log-in using the bulletin board information provided by the apparatus 100 for relaying a service has been described with reference to FIG. 2. Hereinafter, a process in which the apparatus 100 for relaying a service updates the account information will be described.

The apparatus for relaying a service may update the account information in the log-in process described above. For example, in the case in which the user attempts to log in the second service apparatus in the state in which he/she currently logs in the first service apparatus through the above-mentioned log-in process, the apparatus 100 for relaying a service may add an access token received from the second service apparatus to account information corresponding to an account logged in first service apparatus. That is, in the case in which the client 30 is logged in the first service apparatus and an access token included in a log-in completion signal for the second service apparatus is not included in account information corresponding to an account of the first service apparatus, the account information registerer 140 of the apparatus 100 for relaying a service may allow the access token corresponding to the second service apparatus to be included in the account information.

Although the case in which both of the log-in and the account information update described above are performed using the access token included in the log-in completion signal has been described, the apparatus for relaying a service may also be implemented in a scheme of using password for each account.

Hereinafter, a process in which the user performing the log-in sets a representative account will be described with reference to FIG. 2. Here, the representative account indicates an account of the service apparatus 60 mainly used by the user in the reply bulletin board. In the case in which the user input a reply, the bulletin board information including the reply bulletin board may display an account through which the reply is input as the representative account. That is, as represented by 250 of FIG. 2, an icon of the service apparatus 60 corresponding to the representative account and an ID of the representative account may be displayed.

The user performs an input for selecting any one of the icons of the service display interface 210. Here, in the case in which the input for selecting the icon of the service display interface 210 is generated in a log-in state, the bulletin board information may include a script displaying the representative account setting interface 220. Therefore, the client 30 displays the representative account setting interface 220 depending on the input of the user. In this case, the user may select the displayed representative account setting interface 220. Therefore, the client 30 may transmit a representative account request signal requesting to set the representative account to the client connector 110. Here, the representative account request signal may include information for identifying a service apparatus corresponding to the icon selected in the service display interface 210. The controller 130 receiving the representative account request signal through the client connector 110 transmits the representative account request signal to the account information registerer 140. The account information registerer 140 sets a representative account in account information corresponding to a corresponding user depending on the representative account request signal.

Hereinabove, the process in which the apparatus 100 for relaying a service sets the representative account has been described.

Hereinafter, a process in which the apparatus 100 for relaying a service inactivates one or more of the registered accounts will be described.

The client 30 receives an input for selecting one of the icons of the service display interface 210 from the user. The client 30 displays the inactivation interface 230 depending on a script included in the bulletin board information. Then, the client 30 may receive an input for selecting the inactivation interface 230 from the user. The client 30 transmits an inactivation request signal requesting inactivation of an account corresponding to the selected icon to the client connector 110. Here, the inactivation request signal may include an ID of the account corresponding to the selected icon. The controller 130 receiving the inactivation request signal through the client connector 110 transmits the inactivation request signal to the account information registerer 140. The account information registerer 140 modifies the account information so that an account corresponding to the ID included in the inactivation request signal is inactivated.

Interworking between the service apparatuses 60 may be stopped with respect to the account inactivated by the above-mentioned process. This will be described later in detail with reference to FIG. 3.

Hereinabove, the process in which the apparatus 100 for relaying a service inactivates the account has been described.

Hereinafter, a process in which the apparatus 100 for relaying a service performs log-out for each account will be described in detail.

The client 30 receives an input for selecting one of the icons of the service display interface 210 from the user. The client 30 displays the inactivation interface 230 depending on a script included in the bulletin board information. Then, the client 30 may receive an input for selecting the log-out interface 240 from the user. The client 30 transmits an inactivation request signal requesting log-out of an account corresponding to the selected icon to the client connector 110. Here, the inactivation request signal may include an ID of the account corresponding to the selected icon. The controller 130 receiving the inactivation request signal through the client connector 110 performs the log-out through an open API provided by the service apparatus 60 corresponding to an ID included in the inactivation request signal.

Although the case in which the log-out is performed for individual accounts has been described above, the bulletin board information may include a separate interface requesting log-out for all accounts. Therefore, the apparatus for relaying a service may perform log-out processes for all accounts through the open APIs of the respective service apparatuses 60.

Hereinabove, the processes in which the apparatus 100 for relaying a service performs the log-in, the setting of the representative account, the setting of the inactivation, and the log-out have been described with reference to FIG. 2. Hereinafter, a process in which the apparatus 100 for relaying a service relays a service in the state in which it is logged in a plurality of accounts will be described.

Figure 3:
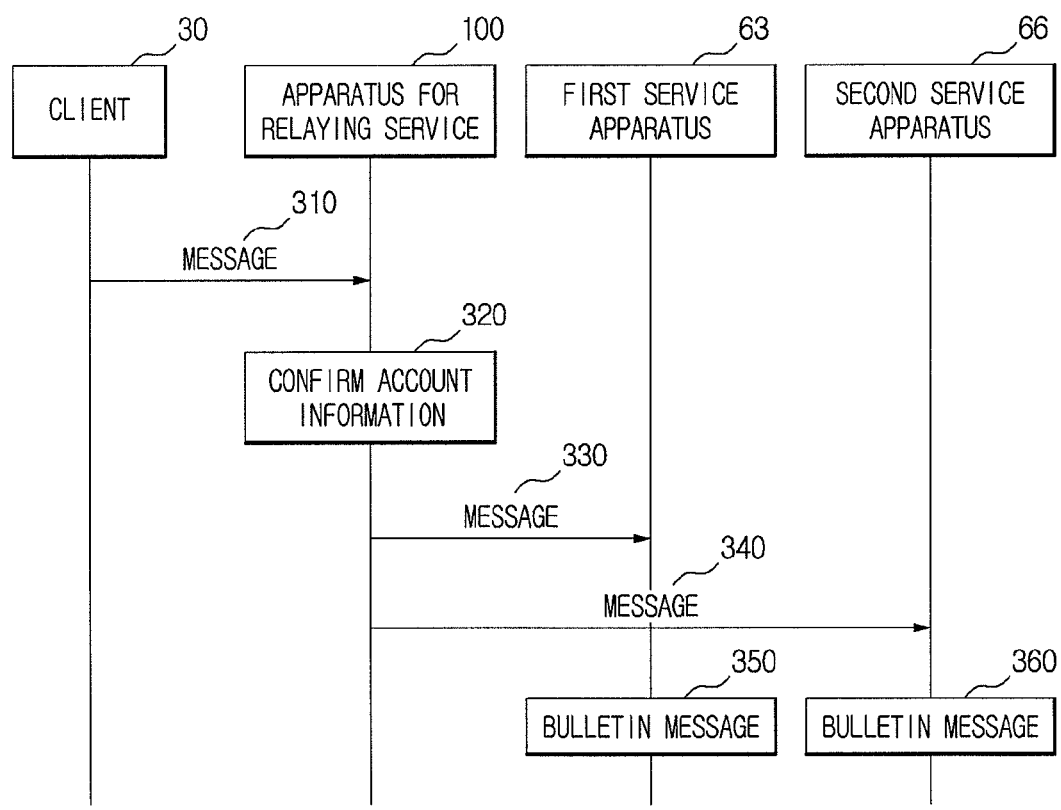

FIG. 3 is a diagram illustrating that the apparatus for relaying a service relays a service. Hereinafter, it will be assumed that the service apparatus 60 connected to the apparatus for relaying a service is an apparatus for providing a social network service (SNS) service. That is, it is assumed that a first service apparatus and a second service apparatus 66 are SNS service providing servers providing separate SNS services, respectively, and do not originally provide a service capable of transmitting messages between the first service apparatus 63 and the second service apparatus 66. In addition, it is assumed that the apparatus 100 for relaying a service provides bulletin board information providing a reply bulletin board included in a web page to the client 30 and the user may receive a message inputting a reply through an interface of the bulletin board information, and it is assumed that the user is in the state in which he/she registers accounts of the first service apparatus 63 and the second service apparatus 66 in the apparatus 100 for relaying a service.

Referring to FIG. 3, in the case in which the user inputs a message through the bulletin board information, the apparatus 100 for relaying a service may provide the corresponding message to the service apparatus 60.

The client 30 receives the message input from the user and transmits the message to the apparatus 100 for relaying a service (310).

The apparatus 100 for relaying a service confirms account information corresponding to the message received from the client 30 (320). That is, the apparatus 100 for relaying a service searches the account information registerer 140 to confirm the account information on the user.

The apparatus 100 for relaying a service confirms IDs for the first service apparatus 63 and the second service apparatus 66 included in the account information confirmed in Step 320 and transmits the message to accounts depending on the corresponding IDs, respectively (330 and 340). That is, the apparatus 100 for relaying a service transmits the message to each of the first service apparatus 63 and the second service apparatus 66 through an open API. Here, the apparatus 100 for relaying a service may convert the message received in Step 310 into message bulletin formats of the respective service apparatuses 60. This will be described later in detail with reference to FIG. 5.

The first service apparatus 63 and the second service apparatus 66 provide SNS services bulletining each of the messages received through the open API (350 and 360).

Hereinabove, the process in which the apparatus 100 for relaying a service transmits and relays the message received from the client 30 to the respective service apparatuses 60 has been described. Hereinafter, a process in which the apparatus 100 for relaying a service transmits a reply notifying message to the respective service apparatuses 60 in the case in which it receives a reply message from the client 30 will be described with reference to FIG. 4.

Figure 4:
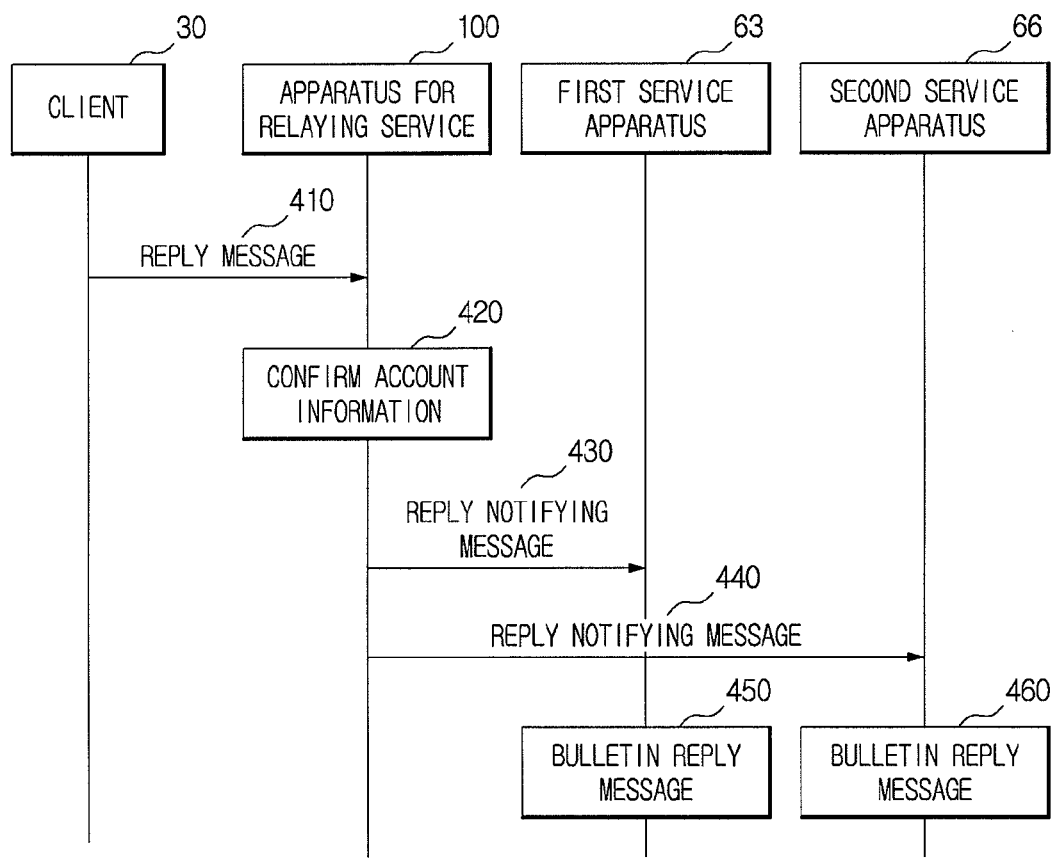

FIG. 4 is a flow chart illustrating that the apparatus for relaying a service relays a reply message received from the client the respective service apparatuses. Hereinafter, it is assumed that the reply message is a reply to a reply of a specific message. Here, a writer of the specific message in the reply bulletin board is called a first text writer, and a writer of a reply to the corresponding message is called a second text writer. In addition, it is assumed that a representative account of the first text writer is an account corresponding to the first service apparatus 63 and a representative account of the second text writer is an account corresponding to the second service apparatus 66.

Referring to FIG. 4, the client 30 transmits the reply message to the apparatus 100 for relaying a service (410).

The apparatus 100 for relaying a service confirms account information on a user corresponding to a text of the reply message (420). That is, the reply message received in Step 410 may be a reply to a specific message or a reply to a reply of the specific message. Therefore, the apparatus 100 for relaying a service may store data indicating users inputting the respective replies bulletined on the reply bulletin board and may identify the user corresponding to the text of the reply message with reference to the stored data. Therefore, the apparatus 100 for relaying a service confirms the account information stored in the account information registerer 140 to confirm the account information on the user corresponding to the text. For example, the apparatus 100 for relaying a service confirms that the first text writer and the second text writer in the reply bulletin board are the user corresponding to the text of the reply message received in Step 410 and confirms the account information on the corresponding user.

The apparatus 100 for relaying a service transmits a reply notifying message to the service apparatus corresponding to the account information (430 and 440). Here, the reply notifying message is a message notifying a user that a reply to a sentence bulletined by him/her is written. The apparatus 100 for relaying a service may generate the reply notifying message so as to include a content of the reply message, a representative account of the user writing the reply message, and a uniform resource locator (URL) of a web page on which the reply message is written, through the message converter 150. For example, the apparatus 100 for relaying a service generates the reply notifying message and transmits the reply notifying message to the first service apparatus 63 and the second service apparatus 66 corresponding to the account depending on the account information confirmed in Step 420.

The first service apparatus 63 and the second service apparatus 66 bulletin, the reply notifying message (450 and 460).

Figure 5:
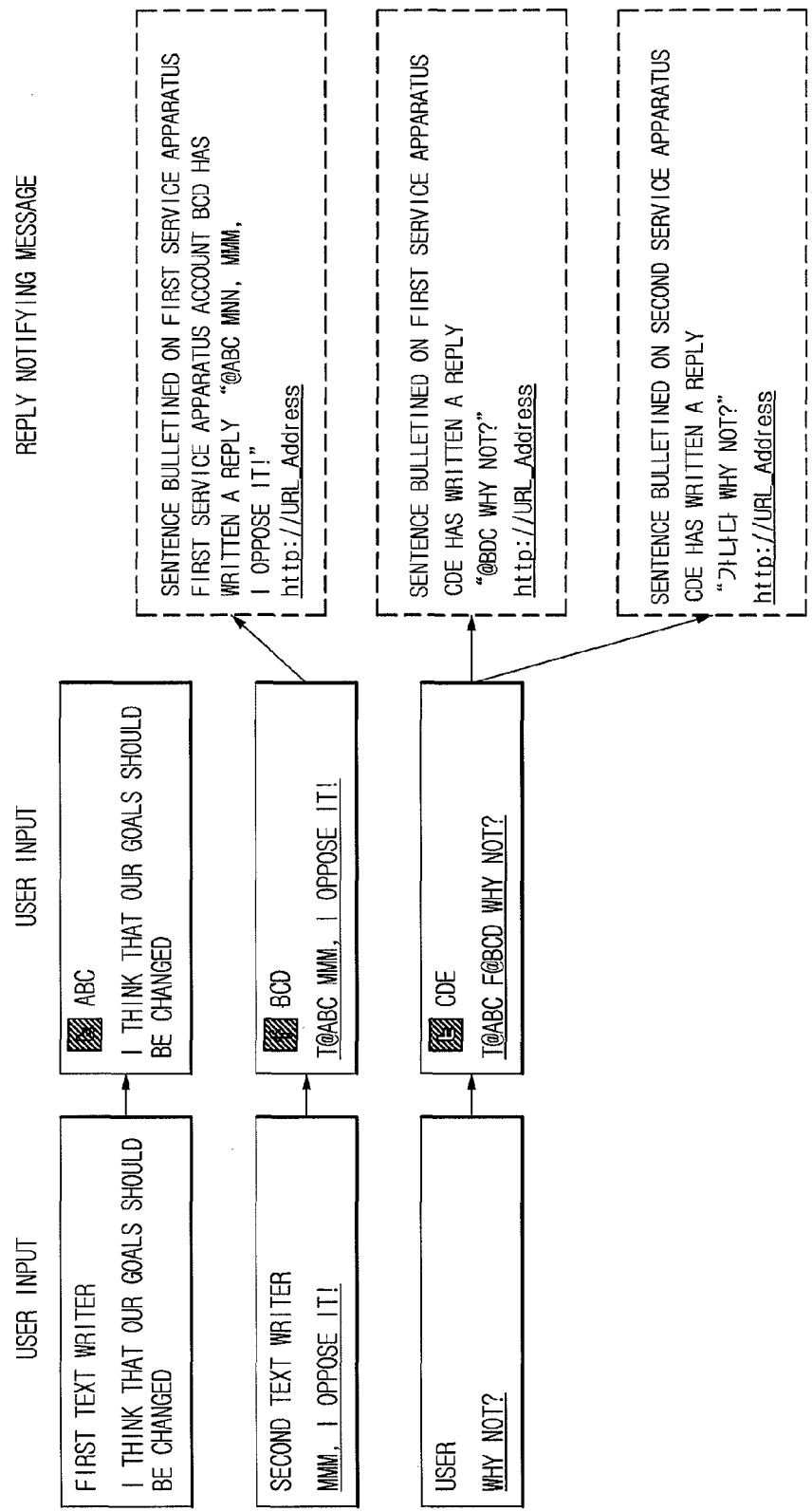

FIG. 5 is a diagram for describing a format of a message converted by a message converter of a service apparatus.

Here, a writer of the specific message in the reply bulletin board is called a first text writer, and a writer of a reply to the corresponding message is called a second text writer. In addition, it is assumed that a representative account of the first text writer is an account corresponding to the first service apparatus 63 and a representative account of the second text writer is an account corresponding to the second service apparatus 66.

Referring to FIG. 5, a message converter 150 of the service apparatus 60 converts a message input by a user into a message to be displayed in the bulletin board information and into a message to be bulletined on the respective service apparatuses 60.

For example, the message converter 150 receives a message "I think that our goals should be changed" written by the first text writer. Since a corresponding message is an original sentence rather than a reply, it is not a sentence bulletined while pointing out a specific user. Therefore, the message converter 150 does not perform message, conversion on the original sentence.

Then, the message converter 150 receives a reply message "Mmm, I oppose it!" input by the second text writer. Here, since the reply input by the second text writer is a reply to the original sentence input by, the first text writer, it is a message to be sent to the first text writer. Therefore, the message converter 150 inserts receiver identifying information "T@ABC" indicating that the reply is the message to be sent to the first text writer into the reply message. Here, "T" indicates a text (hereinafter, referred to as a service identifier) identifying the service apparatus 60 corresponding to a representative account of the first text writer, "ABC" indicates an ID (representative account) of the first text writer, and "@" indicates a distinguisher distinguishing between the ID and the service identifier. Therefore, "T@ABC" indicates a message to be sent to a user of which an account ID of a service apparatus corresponding to "T" is "ABC". The message converter 150 transmits a display message into which the receiver identifying information is inserted to the controller 130, and the controller 130 inserts the corresponding display message into bulletin board information and outputs the bulletin board information into which the corresponding display message is inserted to through the client 30.

In this case, the message converter 150 converts the reply input by the second text writer into a message having a format appropriate for being bulletined on a service apparatus corresponding to the representative account of the first text writer. For example, the message converter 150 inserts "@ABC" and a URL of a web page on which the second text writer writes the reply into the message to generate a conversion message. Here, "@ABC" is an identifier indicating who a receiver of the corresponding message is in the first service apparatus 63. "@ABC" may be differently changed depending on a scheme in which an identifier identifying a receiver is configured in the service apparatus. The message converter 150 transmits the conversion message to the controller 130. The controller 130 may transmit the conversion message to the first service apparatus 63 through the open API to allow the conversion message to be bulletined in an SNS of the first text writer.

Then, the message converter 150 receives a reply to the reply of the second text writer. The message converter 150 inserts receiver identifying information corresponding to the first text writer and the second text writer into a message of the reply to the reply of the second text writer to generate a display message. In addition, the message converter 150 may insert an identifier having a format corresponding to each of the first service apparatus 63 and the second service apparatus 66 and identifying a receiver into the message of the reply to the reply of the second text writer and insert a URL of a web page on which the reply to the reply of the second text writer is input into the message of the reply to the reply of the second text writer to generate the conversion message. The message converter 150 may transmit the display message to the controller 130 to allow the display message to be inserted into the bulletin board information and may transmit the conversion message to the controller 130 to transmit the conversion message to each of the first service apparatus 63 and the second service apparatus 66. Here, the controller 130 may generate information indicating what service apparatus the message has been transferred to and transmit the information to the client 30 through the client connector 110.

Therefore, the apparatus 100 for relaying a service inputs messages in specific bulletin board information, thereby making it possible to relay transmission of messages between heterogeneous service apparatuses 60. In addition, the apparatus 100 for relaying a service allows a message written as a reply by the user to be bulletined in an SNS of the user oneself or other persons, thereby making it possible to prevent the user from writing a malicious reply using anonymity.

Hereinabove, the present invention has been described with reference to exemplary embodiments thereof. Many exemplary embodiments other than the above-mentioned exemplary embodiments fall within the scope of the present invention. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the following claims rather than the above-mentioned description, and all technical spirits equivalent to the following claims should be interpreted as being included in the present invention.

The invention claimed is:

1. An apparatus for relaying a service, comprising:
   a client connector configured to send bulletin board information to a client and receive a message from the client;
   a content storage configured to store the bulletin board information;
   a controller configured to insert the message into the bulletin board information;
   an account information registerer configured to store account information on each user; and
   a service connector configured to transmit the message to one or more service apparatuses corresponding to the account information,
   wherein the bulletin board information includes a module configured to request log-in to the one or more service apparatuses and interwork with the apparatus for relaying a service by the client.

2. The apparatus for relaying a service of claim 1 wherein the account information registerer is configured to insert information corresponding to an account included in a log-in completion signal into the account information in the case in which it receives the log-in completion signal of the account corresponding to the user indicating that the log-in has been completed to the service connector.

3. The apparatus for relaying a service of claim 2, wherein the information corresponding to the account is one or more of an identification (ID), an access token, and a password corresponding to the account.

4. The apparatus for relaying a service of claim 1, further comprising a message converter configured to generate a conversion message by inserting one or more of receiver identifying information, indicating a receiver of the message and a universal resource locator (URL) of a web page on which the message is input, into the message, wherein the controller is configured to transmit the conversion message to the one or more service apparatuses corresponding to the account information.

5. The apparatus for relaying a service of claim 1, wherein the bulletin board information further includes a representative account setting interface configured to set any one of the one or more service apparatuses to a representative account, and
   wherein the account information registerer is configured to set any one of the one or more service apparatuses to the representative account depending on an input of the user through the representative account setting interface.

6. The apparatus for relaying, a service of claim 5, wherein the content storage is configured to insert the message into the bulletin board information and set an account of a writer of the message to the representative account.

7. A method for relaying a service by an apparatus for relaying a service providing bulletin board information to a client, comprising:
   sending the bulletin board information to the client;
   receiving a message from the client;
   inserting the message into the bulletin board information; and
   transmitting the message to one or more service apparatuses corresponding to account information on the client,
   wherein the bulletin board information includes a module configured to request log-in to the one or more service apparatuses and interwork with the apparatus for relaying a service by the client.

8. The method for relaying a service of claim 7, further comprising inserting information corresponding to an account included in a log-in completion signal into the account information in the case in which it receives the log-in completion signal of the account corresponding to a user from the one or more service apparatuses.

9. The method for relaying a service of claim 8, Wherein the information corresponding to the account is one or more of an ID, an access token, and a password corresponding to the account.

10. The method for relaying a service of claim 7, further comprising generating a conversion message by inserting one or more of receiver identifying information, indicating a receiver of the message and a URL of a web page on which the message is input, into the message,
    wherein the transmitting comprises transmitting the conversion message to the one or more service apparatuses corresponding to the account information.

11. The method for relaying a service of claim 7, wherein the bulletin board information includes a representative account setting interface setting any one of the one or more service apparatuses to a representative account, and
    the method for relaying a service further comprising setting any one of the one or more service apparatuses to the representative account depending on an input of a user through the representative account setting interface.

12. The method for relaying a service of claim 7, further comprising inserting the message into the bulletin board information and setting a writer of the message to the representative account.

* * * * *